United States Patent
Matsuda

(10) Patent No.: US 9,664,252 B2
(45) Date of Patent: May 30, 2017

(54) DRIVE BELT

(71) Applicant: BANDO CHEMICAL INDUSTRIES, LTD., Kobe-shi (JP)

(72) Inventor: Hisashi Matsuda, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/688,931

(22) Filed: Apr. 16, 2015

(65) Prior Publication Data

US 2015/0219185 A1    Aug. 6, 2015

Related U.S. Application Data

(63) Continuation of application No. PCT/JP2013/005383, filed on Sep. 11, 2013.

(30) Foreign Application Priority Data

Oct. 23, 2012 (JP) ................. 2012-234000

(51) Int. Cl.

| | |
|---|---|
| *F16G 1/08* | (2006.01) |
| *F16G 1/10* | (2006.01) |
| *F16G 5/08* | (2006.01) |
| *F16G 5/20* | (2006.01) |
| *C08K 5/098* | (2006.01) |
| *C08K 3/04* | (2006.01) |
| *F16G 5/06* | (2006.01) |

(52) U.S. Cl.
CPC ................ *F16G 1/08* (2013.01); *C08K 3/04* (2013.01); *C08K 5/098* (2013.01); *F16G 1/10* (2013.01); *F16G 5/06* (2013.01); *F16G 5/08* (2013.01); *F16G 5/20* (2013.01); *C08L 2312/00* (2013.01)

(58) Field of Classification Search
CPC ....... F16G 1/06–1/10; F16G 5/04–5/08; F16G 5/20; C08L 23/16; C08K 5/098
See application file for complete search history.

(56) References Cited

U.S. PATENT DOCUMENTS

| | | |
|---|---|---|
| 2002/0161086 A1 | 10/2002 | Hannay et al. |
| 2009/0011884 A1 | 1/2009 | Nakashima et al. |
| 2009/0239014 A1 | 9/2009 | Noguchi et al. |

FOREIGN PATENT DOCUMENTS

| | | |
|---|---|---|
| CN | 1268632 A | 10/2000 |
| CN | 1348070 A | 5/2002 |
| EP | 1043517 A1 | 10/2000 |
| EP | 1167814 A1 | 1/2002 |
| JP | 2000-027949 A | 1/2000 |
| JP | 2002-069240 A | 3/2002 |
| JP | 2002-257199 A | 9/2002 |
| JP | 2002-327125 A | 11/2002 |
| JP | 2004-116720 A | 4/2004 |
| JP | 2006-029493 A | 2/2006 |
| JP | 2012-071722 A | 4/2012 |
| WO | 2007/102310 A1 | 9/2007 |
| WO | WO 2009/072553 A1 | 6/2009 |
| WO | 2010/047029 A1 | 4/2010 |

OTHER PUBLICATIONS

Machine translation of JP 2000-027949, 2000.*

* cited by examiner

*Primary Examiner* — Wenwen Cai
(74) *Attorney, Agent, or Firm* — Knobbe Martens Olson & Bear LLP

(57) ABSTRACT

A power transmission belt is used by being wound around a flat pulley so that an outer peripheral surface thereof contacts with the flat pulley. A portion forming the outer peripheral surface is made of a rubber composition including an ethylene-α-olefin elastomer as a rubber component thereof. The dynamic viscoelasticity properties of the rubber composition in a belt length direction satisfy ((a loss tangent tan δ at a temperature of 25° C. and a dynamic strain of 3.0%)/(a storage elastic modulus E' at a temperature of 25° C. and a dynamic strain 3.0%))×1000≤3.0 $MPa^{-1}$, and (a storage elastic modulus E' at a temperature of 25° C. and a dynamic strain of 1.0%)/(a storage elastic modulus E' at a temperature of 25° C. and a dynamic strain of 3.0%)≤1.30.

8 Claims, 5 Drawing Sheets

DRIVE BELT

CROSS-REFERENCE TO RELATED APPLICATIONS

This is a continuation of International Application No. PCT/JP2013/005383 filed on Sep. 11, 2013, which claims priority to Japanese Patent Application No. 2012-234000 filed on Oct. 23, 2012. The entire disclosures of these applications are incorporated by reference herein.

BACKGROUND

The present invention relates to a power transmission belt.

It is a well-known technique to make a rubber composition for power transmission belts by adding zinc dimethacrylate to an ethylene-α-olefin elastomer which forms a rubber component of the composition.

For example, Japanese Unexamined Patent Publication No. 2002-327125 and WO 2010/047029 disclose rubber compositions for power transmission belts, in which carbon black, zinc dimethacrylate, or any other suitable additive is mixed in an ethylene-α-olefin elastomer that is used as their rubber component.

SUMMARY

The present invention is directed to a power transmission belt used by being wound around a flat pulley so that an outer peripheral surface and/or an inner peripheral surface of the belt contacts with the flat pulley, wherein a portion forming the outer and/or inner peripheral surface(s) is made of a rubber composition including an ethylene-α-olefin elastomer as a rubber component thereof, and dynamic viscoelasticity properties of the rubber composition in a belt length direction satisfy ((a loss tangent tan δ at a temperature of 25° C. and a dynamic strain of 3.0%)/(a storage elastic modulus E' at a temperature of 25° C. and a dynamic strain 3.0%))×1000≤3.0 MPa$^{-1}$, and (a storage elastic modulus E' at a temperature of 25° C. and a dynamic strain of 1.0%)/(a storage elastic modulus E' at a temperature of 25° C. and a dynamic strain of 3.0%)≤1.30.

DETAILED DESCRIPTION

Embodiments will now be described in detail with reference to the drawings.

First Embodiment

Figure 1:
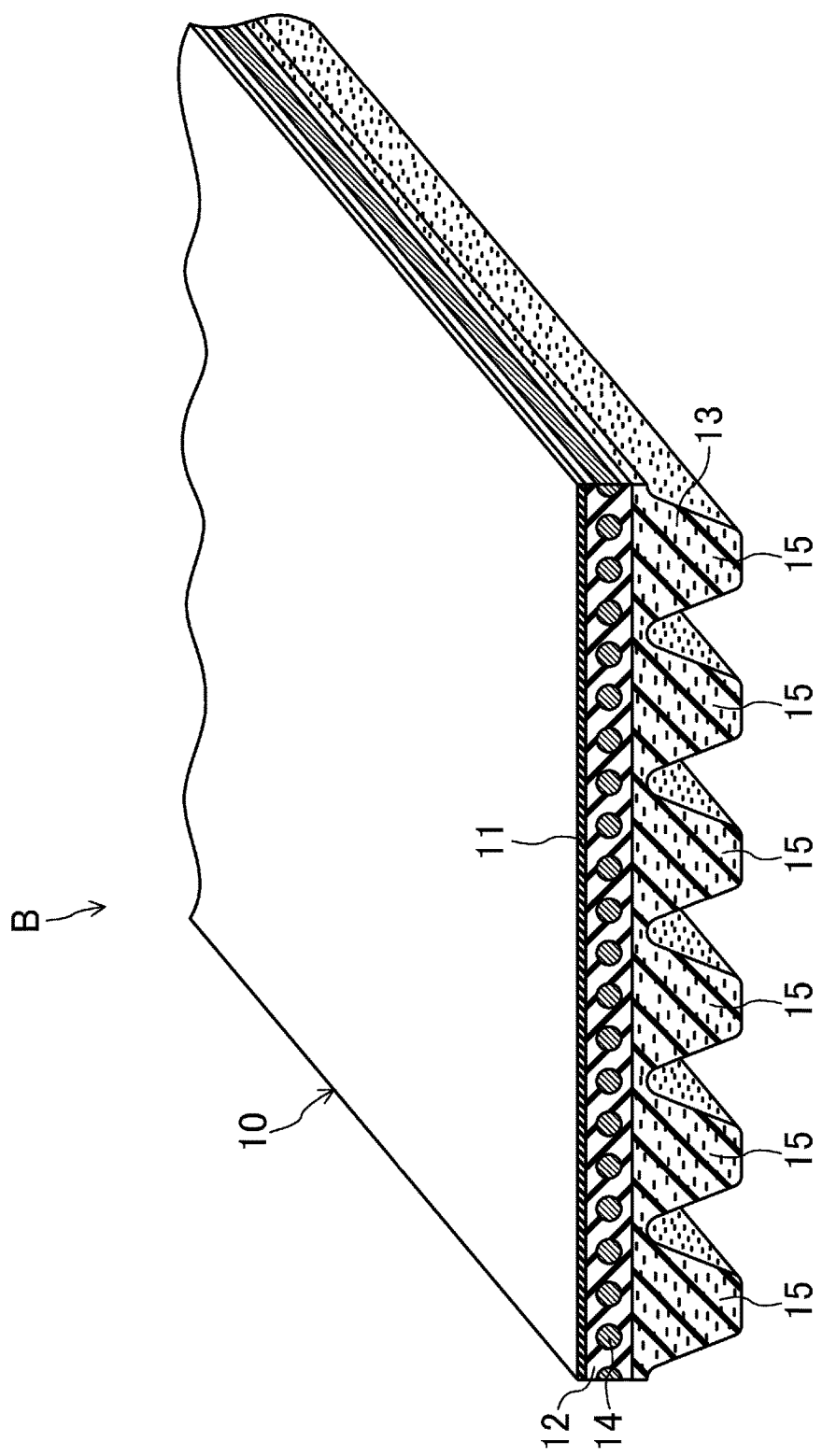
FIG. 1 is a perspective view illustrating a V-ribbed belt as a first embodiment.

FIG. 1 illustrates a V-ribbed belt B as a first embodiment. The V-ribbed belt B of the first embodiment is, for example, an endless type belt used as a power transmission member for an accessory drive belt transmission system provided in the engine compartment of an automobile. The V-ribbed belt B of the first embodiment has a length of 700 to 3000 mm, a width of 10 to 36 mm, and a thickness of 4.0 to 5.0 mm, for example.

The V-ribbed belt B of the first embodiment has a three-layer V-ribbed belt body 10 comprised of a backside rubber layer 11 on the outer periphery of the belt, an intermediate adhesive rubber layer 12, and a compressed rubber layer 13 on the inner periphery of the belt. A cord 14 is embedded in the adhesive rubber layer 12 such that it forms a helical pattern at a predetermined pitch in the belt width direction.

The backside rubber layer 11 is in the shape of a strip having a horizontally-elongated rectangular cross-section, and has a thickness of 0.4 to 0.8 mm, for example. The surface of the backside rubber layer 11, that is, the outer peripheral surface of the V-ribbed belt B preferably has a weave pattern transferred from woven fabric to reduce the noise produced between the belt's outer peripheral surface and the flat pulley. The backside rubber layer 11 is made of a rubber composition produced by heating and pressing an uncrosslinked rubber composition which has been prepared by mixing and kneading a rubber component with various ingredients, and then by crosslinking the kneaded product with a crosslinker.

The rubber component of the rubber composition that makes the backside rubber layer 11 is an ethylene-α-olefin elastomer. Examples of the ethylene-α-olefin elastomers include ethylene-propylene-diene terpolymer (EPDM, hereinafter referred to as "EPDM"), ethylene-propylene copolymer (EPM), ethylene-butene copolymer (EBM), and ethylene-octene copolymer (EOM). Among other things, EPDM is preferred. The rubber component may be either made of a single species or made of a mixture of a plurality of species.

The Mooney viscosity ML$_{1+4}$ (100° C.) of the ethylene-α-olefin elastomer is preferably 20 or more, more preferably 30 or more, and still more preferably 40 or more, and is preferably 90 or less, more preferably 70 or less, and even more preferably 60 or less.

The ethylene content of the ethylene-α-olefin elastomer is preferably 40 mass % or more, more preferably 50 mass % or more, and still more preferably 55 mass % or more, and is preferably 70 mass % or less, more preferably 65 mass % or less, and still more preferably 60 mass % or less.

The diene content of the ethylene-α-olefin elastomer is preferably 2.0 mass % or more, and more preferably 3.0 mass % or more, and is preferably 12.0 mass % or less, more preferably 10.0 mass % or less, and still more preferably 8.0 mass % or less.

Examples of the ingredients include a reinforcing material such as carbon black, a softener, an unsaturated metal carboxylate salt, a vulcanization accelerator aid, a crosslinker, a vulcanization accelerator, and short fibers.

Carbon black, in particular, is preferred as the reinforcing material. Examples of those carbon blacks include: channel black; furnace blacks such as SAF, ISAF, N-339, HAF, N-351, MAF, FEF, SRF, GPF, ECF, and N-234; thermal blacks such as FT and MT; and acetylene blacks. Silica may also be used as the reinforcing material. Among these materials, FEF carbon black is preferably contained. The reinforcing material may be made of either a single species or a plurality of species. The content of the reinforcing material added relative to 100 parts by mass of the rubber component is preferably 5 parts by mass or more, more preferably 7.0 parts by mass or more, and still more preferably 9.0 parts by mass or more, and is preferably added 25 parts by mass or less, more preferably 20 parts by mass or less, and still more preferably 15 parts by mass or less.

Examples of the softeners include petroleum softeners (paraffinic process oil and naphthenic process oil), mineral oil-based softeners such as paraffin wax, and vegetable oil based-softeners such as castor oil, cottonseed oil, linseed oil, rapeseed oil, soybean oil, palm oil, coconut oil, peanut oil, Japan wax, rosin, and pine oil. Paraffinic process oil is preferred among these softeners. The softener may be made of either a single species or a plurality of species. The content of the softener added relative to 100 parts by mass of the rubber component may be 2 to 30 parts by mass, for example.

The unsaturated metal carboxylate salt is a salt of a metal and an unsaturated carboxylic acid having at least one carboxyl group. Examples of the unsaturated carboxylic acids include: monocarboxylic acids such as acrylic acid and methacrylic acid; and dicarboxylic acids such as maleic acid, fumaric acid, and itaconic acid. Examples of the metals include zinc, magnesium, calcium, barium, titanium, chromium, iron, cobalt, nickel, aluminum, tin, and lead. Among these combinations of metals and acids, zinc acrylate and/or zinc dimethacrylate is preferably contained. The softener may be made of either a single species or a plurality of species.

The molar ratio of the unsaturated carboxylic acid to the metal (the number of moles of the unsaturated carboxylic acid/the number of moles of the metal) is preferably 2 mol/1 mol. The content of the unsaturated metal carboxylate salt added relative to 100 parts by mass of the rubber component is preferably 30 parts by mass or more, more preferably 40 parts by mass or more, and still more preferably 50 parts by mass or more, and is preferably 70 parts by mass or less, more preferably 65 parts by mass or less, and still more preferably 60 parts by mass or less.

The content of the sum of the unsaturated metal carboxylate salt and carbon black added relative to 100 parts by mass of the rubber component is preferably 35 parts by mass or more, more preferably 45 parts by mass or more, and still more preferably 55 parts by mass or more, and is preferably 95 parts by mass or less, more preferably 85 parts by mass or less, and still more preferably 75 parts by mass or less.

The ratio of the unsaturated metal carboxylate salt added to the carbon black added (unsaturated metal carboxylate salt/carbon black) is preferably 1.2/1 to 14/1, more preferably 2/1 to 10/1, and still more preferably 3/1 to 9/1.

Examples of the vulcanization accelerator aids include metallic oxides such as magnesium oxide and zinc oxide (zinc flower), metal carbonates, and fatty acids such as stearic acid, and derivatives thereof. Among these compounds, zinc oxide and stearic acid are preferred. The vulcanization accelerator aid may be made of either a single species or a plurality of species. The content of the vulcanization accelerator aid added relative to 100 parts by mass of the rubber component may be 0.5 to 8 parts by mass, for example.

Examples of the crosslinkers include sulfur and organic peroxides. Sulfur, an organic peroxide, or a combination of sulfur and an organic peroxide may be used as the crosslinker, but an organic peroxide is preferred to the others. The content of the crosslinker added is, in the case of sulfur, 0.5 to 4.0 parts by mass relative to 100 parts by mass of the rubber component, and in the case of organic peroxide, preferably 0.5 to 15 parts by mass, and more preferably 8 to 12 parts by mass, relative to 100 parts by mass of the rubber component.

Examples of the vulcanization accelerators include guanidine based, aldehyde-amine based, aldehyde-ammonia based, thiazole based, sulfenamide based, thiourea based, thiuram based, dithiocarbamate based, and xanthate based accelerators, and a mixture of these accelerators. Among these accelerators, sulfenamide based, thiuram based, and dithiocarbamate based accelerators are preferred. The vulcanization accelerator may be made of either a single species or a plurality of species. The content of the vulcanization accelerator added relative to 100 parts by mass of the rubber component is 0.5 to 4.0 parts by mass, for example.

Examples of the short fibers include nylon short fibers, vinylon short fibers, aramid short fibers, polyester short fibers, and cotton short fibers. The short fibers are manufactured by cutting long fibers in their longitudinal direction into pieces having a predetermined length. For example, the short fibers may be subjected to an adhesion treatment in which the fibers are heated after being soaked in a resorcinol formaldehyde latex aqueous solution (hereinafter referred to as a "RFL aqueous solution") or any other suitable solution. The short fibers have a length of, e.g., 0.2 to 5.0 mm and a diameter of, e.g., 10 to 50 μm. The short fibers may be oriented in the belt length direction or the belt width direction, or may not be oriented. The content of the short fibers added relative to 100 parts by mass of the rubber component is, for example, 0.1 to 30 parts by mass.

The makeup of the rubber composition that makes the backside rubber layer 11 is designed such that the dynamic viscoelasticity in the belt length direction exhibits the following properties.

Specifically, the storage elastic modulus E' at a dynamic strain of 3.0% and a temperature of 25° C. (hereinafter referred to as "E' (3.0%)"), the loss tangent tan δ at a dynamic strain of 3.0% and a temperature of 25° C. (hereinafter referred to as "tan δ (3.0%)"), and the storage elastic modulus E' at a dynamic strain of 1.0% and a temperature of 25° C. (hereinafter referred to as "E' (1.0%)") are expressed as follows:

$$(\tan \delta(3.0\%)/E'(3.0\%)) \times 1000 \leq 3.0 \text{ MPa}^{-1}, \text{ and}$$

$$E'(1.0\%)/E'(3.0\%) \leq 1.30$$

(tan δ(3.0%)/E' (3.0%))×1000 is preferably 2.9 MPa$^{-1}$ or less, more preferably 2.7 MPa$^{-1}$ or less, and still more preferably 2.5 MPa$^{-1}$ or less. (tan δ (3.0%)/E' (3.0%))×1000 is preferably 0.1 MPa$^{-1}$ or more.

E' (1.0%)/E' (3.0%) is preferably 1.3 or less, more preferably 1.28 or less, and still more preferably 1.25 or less. E' (1.0%)/E' (3.0%) is preferably 0.90 or more.

The dynamic viscoelasticity properties can be obtained compliant with JIS K6394. Specifically, a test piece in a narrow rectangular shape is chucked at its upper and lower ends by a dynamic mechanical analyzer, and is given a static strain which is 20% larger than dynamic strain to be applied (e.g., a static strain of 3.6% for a dynamic strain of 3.0%, and a static strain of 1.2% for a dynamic strain of 1.0%) with respect to the initial length of the test piece, i.e., a distance between the chucks. Then, the test piece is given a predetermined dynamic strain at a frequency of 10 Hz within an ambient at a temperature of 25° C. to measure the storage elastic modulus E' and loss elastic modulus E" and calculate a loss tangent tan δ that is the ratio of these two moduli.

If a conventional V-ribbed belt, of which a backside portion forming the outer peripheral surface is made of a rubber composition, is laid out so as to be wound around a flat pulley and have its outer peripheral surface brought into contact with the flat pulley, the rubber may get worn so much as to have debris sticking to the flat pulley. Such rubber sticking to the flat pulley produces noise. Similarly, in a flat belt, of which a portion forming the inner peripheral surface is made of a rubber composition, the rubber may also stick to the flat pulley.

On the other hand, according to the V-ribbed belt B of the first embodiment, such sticking of the rubber to a flat pulley can be reduced even if the belt is used so as to be wound around the flat pulley and have its outer peripheral surface brought into contact with the flat pulley. The reason is that the backside rubber layer 11 forming the outer peripheral surface that contacts with the flat pulley is made of a rubber composition including an ethylene-α-olefin elastomer as a rubber component thereof. And the dynamic viscoelasticity properties of such a composition exhibit a small hysteresis loss in a strain area to be formed when the belt is wound around the flat pulley, and have a small decrease in the storage elastic modulus E' caused by a change in strain.

The adhesive rubber layer 12 is in the shape of a strip with a horizontally-elongated rectangular cross-section, and has a thickness of 1.0 to 2.5 mm, for example. The compressed rubber layer 13 has a plurality of V-shaped ribs 15 that protrude perpendicularly from the inner peripheral surface of the belt. The plurality of V-shaped ribs 15 each have the shape of a rib extending in the belt length direction, and an approximately inverted triangular cross-section, and are arranged side by side in the belt width direction. Each of the V-shaped ribs 15 has, for example, a height of 2.0 to 3.0 mm, and a width of 1.0 to 3.6 mm between their bases. Further, the number of ribs of the belt may be three to six (e.g., six in the example shown in FIG. 1).

The adhesive rubber layer 12 and the compressed rubber layer 13 are made of rubber compositions produced by heating and pressing an uncrosslinked rubber composition prepared by kneading and mixing a rubber component with various ingredients, and then by crosslinking the kneaded product with a crosslinker.

Examples of the rubber components of the rubber compositions that make the adhesive rubber layer 12 and the compressed rubber layer 13 include an ethylene-α-olefin elastomer, chloroprene rubber (CR), chlorosulfonated polyethylene rubber (CSM), and hydrogenated acrylonitrile-butadiene rubber (H-NBR). Preferably, the rubber components of the adhesive rubber layer 12 and the compressed rubber layer 13 are the same ethylene-α-olefin elastomer as the one used for the backside rubber layer 11.

Examples of the ingredients include, similarly to the backside rubber layer 11, reinforcing materials such as carbon black, softeners, unsaturated metal carboxylate salts, vulcanization accelerator aids, crosslinkers, vulcanization accelerators, and short fibers. If short fibers are mixed in the rubber composition that makes the compressed rubber layer 13, it is preferred that the short fibers be oriented in the belt width direction and protrude from the surface of the belt. On the other hand, if short fibers are not mixed in the rubber composition that makes the compressed rubber layer 13, short fibers may be implanted in the surfaces of the V-shaped ribs 15 of the compressed rubber layer 13.

The makeups of the rubber compositions that make the backside rubber layer 11, the adhesive rubber layer 12, and the compressed rubber layer 13 may be either different from each other or the same as each other.

The cord 14 is made of twisted yarn of polyester fibers (PET), polyethylene naphthalate fibers (PEN), aramid fibers, vinylon fibers, or any other appropriate fibers. To provide the cord 14 with the adhesive property to the V-ribbed belt body 10, the cord 14 is subjected to an adhesion treatment in which the cord 14 is soaked in an RFL aqueous solution and thereafter heated and/or an adhesion treatment in which the cord 14 is soaked in rubber cement and thereafter dried, prior to a molding process.

The V-ribbed belt B of the first embodiment may be manufactured by a known manufacturing method. However, the unsaturated metal carboxylate salt may be mixed with the rubber composition that makes the backside rubber layer 11 in the following manner. For example, the unsaturated metal carboxylate salt may be mixed by itself with the rubber composition being kneaded. Alternatively, the unsaturated carboxylic acid and an oxide, a hydroxide, or a carbonate of a metal may be separately introduced and mixed together, and then allowed to react with each other during the kneading.

Figure 2:
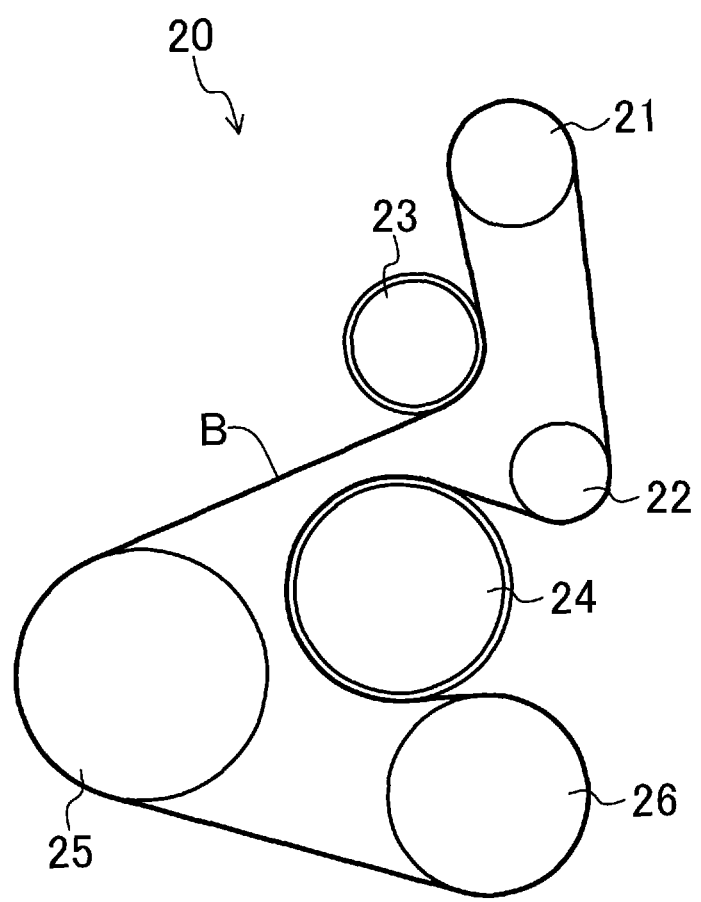
FIG. 2 illustrates a layout of pulleys for an accessory drive belt transmission system of an automobile which uses the V-ribbed belt of the first embodiment.

FIG. 2 illustrates a layout of pulleys for an accessory drive belt transmission system 20 of an automobile which uses the V-ribbed belt B of the first embodiment. This accessory drive belt transmission system 20 is a serpentine drive type system for transmitting power through the V-ribbed belt B that is wound around six pulleys comprised of four ribbed pulleys and two flat pulleys.

This accessory drive belt transmission system 20 includes: a power steering pulley 21 arranged at the uppermost position; an AC generator pulley 22 arranged on a slightly lower right side of the power steering pulley 21; a tensioner pulley 23 which is a flat pulley arranged on a lower left side of the power steering pulley 21 and on a upper left side of the AC generator pulley 22; a water-pump pulley 24 which is a flat pulley arranged on a lower left side of the AC generator pulley 22 and right under the tensioner pulley 23; a crankshaft pulley 25 arranged on a lower left side of the tensioner pulley 23 and the water-pump pulley 24; and an air-conditioner pulley 26 arranged on a lower left side of the water-pump pulley 24 and the crankshaft pulley 25. All of these pulleys but the tensioner pulley 23 and water-pump pulley 24, which are flat pulleys, are ribbed pulleys. These ribbed pulleys and flat pulleys may be, for example, pressed metal products, cast products, or molded resin products made of a nylon resin or a phenolic resin, and have a diameter of 50 to 150 mm. Specifically, each of the flat pulleys, i.e., the tensioner pulley 23 and the water-pump pulley 24, has a diameter of 80 to 120 mm.

In this accessory drive belt transmission system 20, the V-ribbed belt B is sequentially wound around the power steering pulley 21 with the V-shaped ribs 15 brought into contact with the pulley 21, the tensioner pulley 23 with the outer peripheral surface of the belt brought into contact with the pulley 23, the crankshaft pulley 25 and the air-conditioner pulley 26 with the V-shaped ribs 15 brought into contact with the pulleys 25 and 26, the water-pump pulley 24 with the outer peripheral surface of the belt brought into contact with the pump pulley 24, and the AC generator pulley 22 with the V-shaped ribs 15 brought into contact with the pulley 22, and then returns to the power steering pulley 21.

In the accessory drive belt transmission system 20 having the above configuration, the backside rubber layer 11 of the V-ribbed belt B of the first embodiment forms the outer peripheral surface which contacts with the flat pulleys, namely, the tensioner pulley 23 and the water-pump pulley 24. Sticking of the rubber to the tensioner pulley 23 and water-pump pulley 24 can be reduced since the backside rubber layer 11 is made of a rubber composition including an ethylene-α-olefin elastomer as a rubber component thereof, the dynamic viscoelasticity properties of the rubber composition exhibit a small hysteresis loss in the strain area formed when the belt is wound around the flat pulley, and just a little decrease in storage elastic modulus E' is caused by a change in strain.

Second Embodiment

Figure 3:
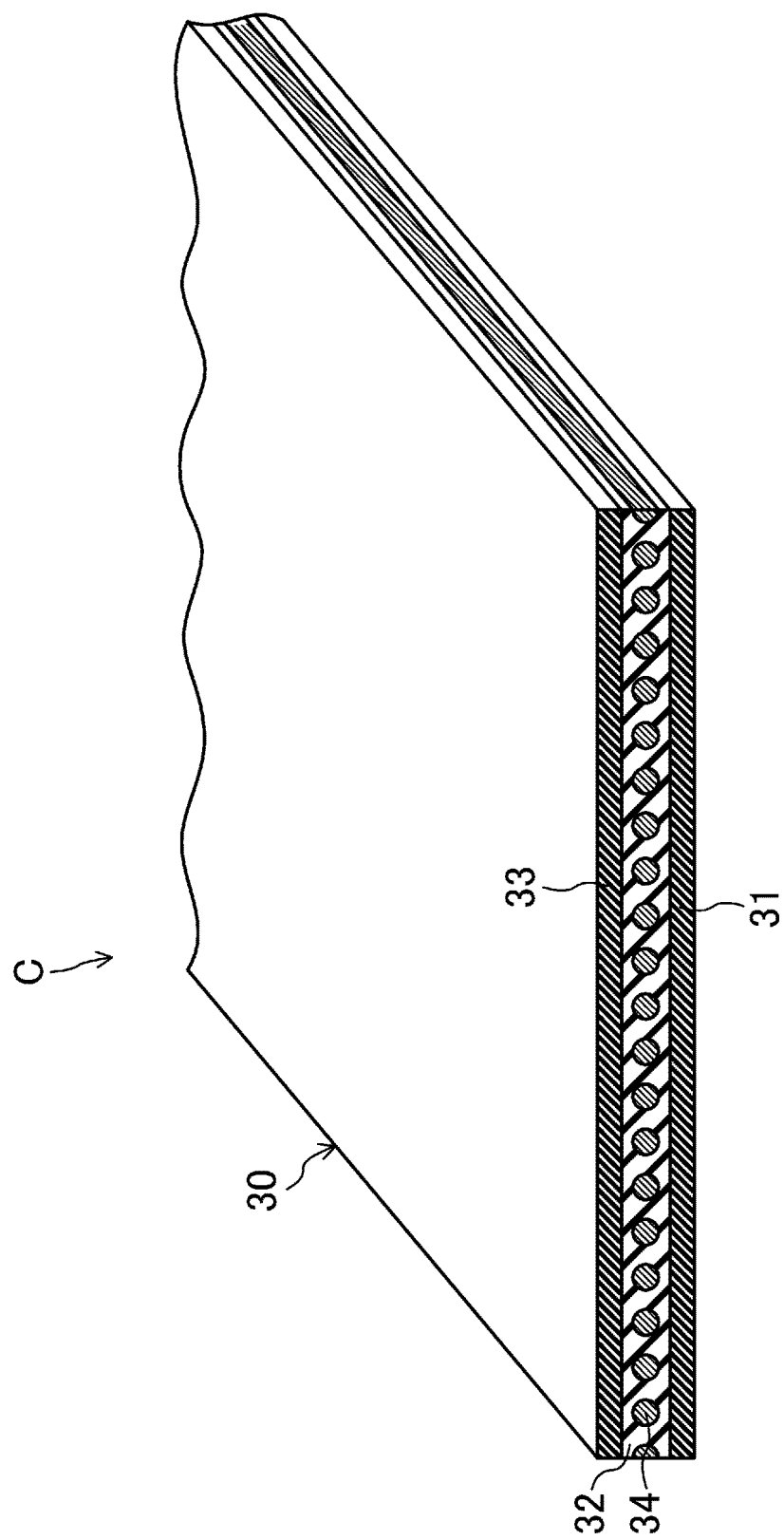
FIG. 3 is a perspective view illustrating a flat belt as a second embodiment.

FIG. 3 illustrates a flat belt C as a second embodiment. The flat belt C of the second embodiment is, for example, an endless type belt used as a power transmission member in a general industrial machine such as a machine tool. The flat belt C of the second embodiment has a length of 100 to 6000 mm, a width of 3 to 300 mm, and a thickness of 0.8 to 2.0 mm, for example.

The flat belt C of the second embodiment has a three-layer flat belt body 30 of rubber which is comprised of an inner rubber layer 31 on the inner periphery of the belt, an intermediate adhesive rubber layer 32, and an outer rubber layer 33 on the outer periphery of the belt. A cord 34 is embedded in the adhesive rubber layer 32 such that it forms a helical pattern at a predetermined pitch in the belt width direction.

The inner rubber layer 31 is in the shape of a strip with a horizontally-elongated rectangular cross-section, and has a thickness of 0.8 to 2.0 mm, for example. The inner rubber layer 31 is made of a rubber composition produced by heating and pressing an uncrosslinked rubber composition prepared by kneading and mixing a rubber component with various ingredients, and then by crosslinking the kneaded product with a crosslinker. The rubber composition that makes the inner rubber layer 31 has the same makeup as the rubber composition that makes the backside rubber layer 11 of the V-ribbed belt B of the first embodiment.

This means that the makeup of the rubber composition that makes the inner rubber layer 31 is designed such that the dynamic viscoelasticity properties in the belt length direction satisfy $(\tan \delta(3.0\%)/E'(3.0\%))\times 1000 \leq 3.0$ MPa$^{-1}$ and $E'(1.0\%)/E'(3.0\%) \leq 1.30$.

According to the flat belt C of the second embodiment, sticking of the rubber to a flat pulley can be reduced when the belt is wound around the flat pulley so that its inner peripheral surface contacts with the flat pulley. The reason is that the inner rubber layer 31 forming the inner peripheral surface of the belt and contacting with the flat pulley is made of a rubber composition including an ethylene-α-olefin elastomer as a rubber component thereof, the dynamic viscoelasticity properties of the rubber composition exhibit, as described above, a small hysteresis loss in the strain area formed when the belt is wound around the flat pulley, and just a little decrease in storage elastic modulus E' is caused by a change in strain.

The adhesive rubber layer 32 and the outer rubber layer 33 are in the shape of a strip with a horizontally-elongated rectangular cross-section, and have a thickness of, e.g., 0.4 to 1.5 mm and a thickness of, e.g., 0.3 to 1.0 mm, respectively. The adhesive rubber layer 32 and the outer rubber layer 33 are also made of rubber compositions produced by heating and pressing an uncrosslinked rubber composition prepared by kneading and mixing a rubber component with various ingredients, and then by crosslinking the kneaded product with a crosslinker. The rubber components and the ingredients may be similar to those of the rubber compositions that make the adhesive rubber layer 12 and the compressed rubber layer 13 of the V-ribbed belt B of the first embodiment. If the flat belt C of the second embodiment is used so as to be wound around a flat pulley and have its outer peripheral surface brought into contact with the flat pulley, it is preferable that the rubber composition which makes the outer rubber layer 33 that forms the outer peripheral surface that is in contact with the flat pulley have similar dynamic viscoelasticity properties to the rubber composition that makes the inner rubber layer 31.

The makeups of the rubber compositions of the inner rubber layer 31, adhesive rubber layer 32, and outer rubber layer 33 may be either different from each other or the same as each other.

The configuration of the cord 34 is similar, for example, to that of the cord 14 of the V-ribbed belt B of the first embodiment.

The flat belt C of the second embodiment may be manufactured by a known manufacturing method. However, the unsaturated metal carboxylate salt may be mixed with the rubber composition that makes the inner rubber layer 31 in the following manner. For example, the unsaturated metal carboxylate salt may be mixed by itself with the rubber composition being kneaded. Alternatively, the unsaturated carboxylic acid and an oxide, a hydroxide, or a carbonate of a metal may be separately introduced and mixed together, and then allowed to react with each other during the kneading.

Figure 4:
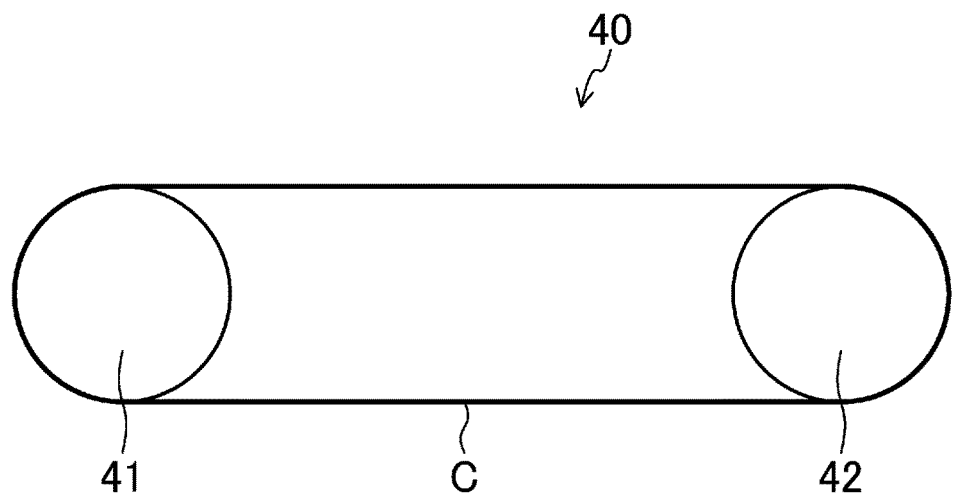
FIG. 4 illustrates a layout of pulleys for a belt transmission system which uses the flat belt of the second embodiment.

FIG. 4 illustrates a layout of pulleys in a belt transmission system 40 which uses the flat belt C of the second embodiment.

In this belt transmission system 40, the flat belt C is wound around a pair of flat pulleys (namely, a drive pulley 41 and a driven pulley 42) so that its inner peripheral surface contacts with the flat pulleys, and transmits power. The diameter of each of the drive pulley 41 and driven pulley 42 is, for example, 30 to 1500 mm. The drive pulley 41 and driven pulley 42 may have either the same diameter or different diameters.

In the belt transmission system 40 having the above configuration, the inner rubber layer 31 of the flat belt C of the second embodiment forms the inner peripheral surface which contacts with the flat pulleys, namely, the drive pulley 41 and the driven pulley 42. Sticking of the rubber to the tensioner pulley 23 and the water-pump pulley 24 can be reduced since the inner rubber layer 31 is made of a rubber composition including an ethylene-α-olefin elastomer as a rubber component thereof, the dynamic viscoelasticity properties of the rubber composition exhibit a small hysteresis loss in the strain area formed when the belt is wound around the flat pulleys, and just a little decrease in storage elastic modulus E' is caused by a change in strain.

Other Embodiments

A V-ribbed belt B and a flat belt C have been described as being used in the first and second embodiments, respectively. However, these are only examples, and the power transmission belt of the present invention may also be any other kind of V-belt or a toothed belt, to name just a few.

Examples

Rubber Composition

The following uncrosslinked rubber compositions 1 to 12 were made. The makeups of each of these rubber compositions will also be shown in Table 1.

<Rubber Composition 1>

EPDM1 (manufactured by Sumitomo Chemical Co., Ltd., product name: ESPRENE 301, Mooney viscosity of $ML_{1+4}$ (100° C.): 55, ethylene content: 62 mass %, and diene content: 3 mass %) was used as a rubber component. In the rubber component, 15 parts by mass of FEF carbon black (manufactured by Tokai Carbon Co., Ltd., product name: SEAST SO), 5 parts by mass of a softener (manufactured by Japan Sun Oil Company, Ltd., product name: SUN-PAR2280), 50 parts by mass of zinc dimethacrylate (manufactured by CRAY VALLEY, product name: SR634), 1 part by mass of a stearic acid as a vulcanization accelerator aid (manufactured by New Japan Chemical Co., Ltd., product name: stearic acid 50S), 5 parts by mass of a zinc oxide as a vulcanization accelerator aid (manufactured by Sakai Chemical Industry Co., Ltd., product name: zinc oxide type III), 10 parts by mass of an organic peroxide as a crosslinker (manufactured by NOF CORPORATION, product name: PEROXYMON F40), and 5 parts by mass of nylon short fibers (manufactured by Asahi Kasei Corporation, product name: Leona 66, fiber length: 1 mm) were mixed together relative to 100 parts by mass of the rubber component. The mixture was kneaded in an internal kneader, and was rolled with calender rolls to obtain a sheet-like uncrosslinked rubber composition 1. The sum of the FEF carbon black and zinc dimethacrylate added in the rubber composition 1 is 65 parts by mass relative to 100 parts by mass of the rubber component. The ratio of the zinc dimethacrylate added to the FEF carbon black added (unsaturated metal carboxylate salt/carbon black) is 3.3.

<Rubber Composition 2>

A sheet-like uncrosslinked rubber composition 2 was made in the same way as the rubber composition 1, except that 70 parts by mass of the zinc dimethacrylate was added relative to 100 parts by mass of the rubber component. The sum of the FEF carbon black and zinc dimethacrylate added in the rubber composition 2 is 85 parts by mass relative to 100 parts by mass of the rubber component. The ratio of the zinc dimethacrylate added to the FEF carbon black added (unsaturated metal carboxylate salt/carbon black) is 4.7.

<Rubber Composition 3>

A sheet-like uncrosslinked rubber composition 3 was made in the same way as in the rubber composition 1, except that 30 parts by mass of the zinc dimethacrylate was added relative to 100 parts by mass of the rubber component. The sum of the FEF carbon black and zinc dimethacrylate added in the rubber composition 3 is 45 parts by mass relative to 100 parts by mass of the rubber component. The ratio of the zinc dimethacrylate added to the FEF carbon black added (unsaturated metal carboxylate salt/carbon black) is 2.0.

<Rubber Composition 4>

A sheet-like uncrosslinked rubber composition 4 was made in the same way as in the rubber composition 3, except that 5 parts by mass of the FEF carbon black was added relative to 100 parts by mass of the rubber component. The sum of the FEF carbon black and zinc dimethacrylate added in the rubber composition 4 is 35 parts by mass relative to 100 parts by mass of the rubber component. The ratio of the zinc dimethacrylate added to the FEF carbon black added (unsaturated metal carboxylate salt/carbon black) is 6.0.

<Rubber Composition 5>

A sheet-like uncrosslinked rubber composition 5 was made in the same way as in the rubber composition 2, except that 5 parts by mass of the FEF carbon black was added relative to 100 parts by mass of the rubber component. The sum of the FEF carbon black and zinc dimethacrylate added in the rubber composition 5 is 75 parts by mass relative to 100 parts by mass of the rubber component. The ratio of the zinc dimethacrylate added to the FEF carbon black added (unsaturated metal carboxylate salt/carbon black) is 14.0.

<Rubber Composition 6>

A sheet-like uncrosslinked rubber composition 6 was made in the same way as in the rubber composition 2, except that 25 parts by mass of the FEF carbon black was added relative to 100 parts by mass of the rubber component. The sum of the FEF carbon black and zinc dimethacrylate added in the rubber composition 6 is 95 parts by mass relative to 100 parts by mass of the rubber component. The ratio of the zinc dimethacrylate added to the FEF carbon black added (unsaturated metal carboxylate salt/carbon black) is 2.8.

<Rubber Composition 7>

A sheet-like uncrosslinked rubber composition 7 was made in the same way as in the rubber composition 6, except that 40 parts by mass of the zinc dimethacrylate was added relative to 100 parts by mass of the rubber component. The sum of the FEF carbon black and zinc dimethacrylate added in the rubber composition 7 is 65 parts by mass relative to 100 parts by mass of the rubber component. The ratio of the zinc dimethacrylate added to the FEF carbon black added (unsaturated metal carboxylate salt/carbon black) is 1.6.

<Rubber Composition 8>

A sheet-like uncrosslinked rubber composition 8 was made in the same way as in the rubber composition 1, except that 80 parts by mass of the zinc dimethacrylate was added relative to 100 parts by mass of the rubber component. The sum of the FEF carbon black and zinc dimethacrylate added in the rubber composition 8 is 95 parts by mass relative to 100 parts by mass of the rubber component. The ratio of the zinc dimethacrylate added to the FEF carbon black added (unsaturated metal carboxylate salt/carbon black) is 5.3.

<Rubber Composition 9>

A sheet-like uncrosslinked rubber composition 9 was made in the same way as in the rubber composition 2, except that 35 parts by mass of the FEF carbon black was added relative to 100 parts by mass of the rubber component. The sum of the FEF carbon black and zinc dimethacrylate added in the rubber composition 9 is 105 parts by mass relative to 100 parts by mass of the rubber component. The ratio of the zinc dimethacrylate added to the FEF carbon black added (unsaturated metal carboxylate salt/carbon black) is 2.0.

<Rubber Composition 10>

A sheet-like uncrosslinked rubber composition 10 was made in the same way as in the rubber composition 9, except that 40 parts by mass of the zinc dimethacrylate was added relative to 100 parts by mass of the rubber component. The sum of the FEF carbon black and zinc dimethacrylate added in the rubber composition 10 is 75 parts by mass relative to 100 parts by mass of the rubber component. The ratio of the zinc dimethacrylate added to the FEF carbon black added (unsaturated metal carboxylate salt/carbon black) is 1.1.

<Rubber Composition 11>

A sheet-like uncrosslinked rubber composition 11 was made in the same way as in the rubber composition 1, except that 6 parts by mass of the crosslinker was added relative to 100 parts by mass of the rubber component. The sum of the FEF carbon black and zinc dimethacrylate added in the rubber composition 11 is 65 parts by mass relative to 100 parts by mass of the rubber component. The ratio of the zinc dimethacrylate added to the FEF carbon black added (unsaturated metal carboxylate salt/carbon black) is 3.3.

<Rubber Composition 12>

EPDM2 (manufactured by JSR Corporation, product name: EP22, Mooney viscosity $ML_{1+4}$ (100° C.): 27, ethylene content: 54 mass %, and diene content: 4.5 mass %) was used as a rubber component. In the rubber component, 70 parts by mass of FEF carbon black (manufactured by Tokai Carbon Co., Ltd., product name: SEAST SO), 7 parts by mass of a softener (manufactured by Japan Sun Oil Company, Ltd., product name: SUNPAR2280), 1 part by mass of a stearic acid as a vulcanization accelerator aid (manufactured by New Japan Chemical Co., Ltd., product name: stearic acid 50S), 5 parts by mass of a zinc oxide as a vulcanization accelerator aid (manufactured by Sakai Chemical Industry Co., Ltd., product name: zinc oxide type III), 2 parts by mass of sulfur as a crosslinker (manufactured by Hosoi Chemical Industry Co., Ltd., product name: OIL SULFUR), 2.5 parts by mass of a vulcanization accelerator (manufactured by OUCHI SHINKO CHEMICAL INDUSTRIAL CO., LTD., product name: NOCCELER MSA, NOCCELER TOT-N, NOCCELER EZ), and 5 parts by mass of nylon short fibers (manufactured by Asahi Kasei Corporation, product name: Leona 66, fiber length: 1 mm) were mixed together relative to 100 parts by mass of the rubber component. The mixture was kneaded in an internal kneader, and was rolled by calender rolls to obtain a sheet-like uncrosslinked rubber composition 12.

The length of each of the flat belts 1-12 was 1200 mm; the width thereof was 20 mm; and the thickness thereof was 2.6 mm.

(Test Method)

<Dynamic Viscoelasticity Properties>

Crosslinked rubber sheets were formed of each of the rubber compositions 1-12, and narrow rectangular test pieces were cut out from the crosslinked rubber sheets such that the longitudinal direction thereof corresponds to the belt length direction. The dynamic viscoelasticity properties of the test pieces were measured compliant with JIS K6394, using a dynamic mechanical analyzer (manufactured by TA Instruments Japan Inc., model number: RSAIII).

Specifically, each of the test pieces was given a static strain, which was 20% larger than dynamic strain to be applied, with respect to the initial length of the test piece, i.e., a distance between the chucks. Then, the test piece was given a predetermined dynamic strain at a frequency of 10 Hz within an ambient at a temperature of 25° C. to measure

TABLE 1

| | RUBBER COMPOSITION | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| EPDM1 | 100 | 100 | 100 | 100 | 100 | 100 | 100 | 100 | 100 | 100 | 100 | |
| EPDM2 | | | | | | | | | | | | 100 |
| FEF CARBON BLACK (A) | 15 | 15 | 15 | 5 | 5 | 25 | 25 | 15 | 35 | 35 | 15 | 70 |
| SOFTENER | 5 | 5 | 5 | 5 | 5 | 5 | 5 | 5 | 5 | 5 | 5 | 7 |
| ZINC DIMETHACRYLATE (B) | 50 | 70 | 30 | 30 | 70 | 70 | 40 | 80 | 70 | 40 | 50 | |
| STEARIC ACID | 1 | 1 | 1 | 1 | 1 | 1 | 1 | 1 | 1 | 1 | 1 | 1 |
| ZINC OXIDE | 5 | 5 | 5 | 5 | 5 | 5 | 5 | 5 | 5 | 5 | 5 | 5 |
| ORGANIC PEROXIDE | 10 | 10 | 10 | 10 | 10 | 10 | 10 | 10 | 10 | 10 | 6 | |
| SULFUR | | | | | | | | | | | | 2 |
| VULCANIZATION ACCELERATOR | | | | | | | | | | | | 2.5 |
| NYLON SHORT FIBERS | 5 | 5 | 5 | 5 | 5 | 5 | 5 | 5 | 5 | 5 | 5 | 5 |
| A + B | 65 | 85 | 45 | 35 | 75 | 95 | 65 | 95 | 105 | 75 | 65 | — |
| B/A | 3.3 | 4.7 | 2.0 | 6.0 | 14.0 | 2.8 | 1.6 | 5.3 | 2.0 | 1.1 | 3.3 | — |

(Power Transmission Belt)

<V-ribbed Belts 1-12>

V-ribbed belts 1-12 of which the backside rubber layer had been made of the above rubber compositions 1-12 were made.

The adhesive rubber layer was made of an EPDM rubber composition. The compressed rubber layer was made of an EPDM rubber composition mixed with nylon short fibers. The cord was made of twisted yarn of polyester (PET) fibers, which was subjected, prior to the molding process, to an adhesion treatment of soaking the twisted yarn in an RFL aqueous solution and thereafter heating the twisted yarn.

The length of each of the V-ribbed belts 1-12 was 1200 mm, and the thickness thereof was 4.3 mm. The height of a V-shaped rib of each of the V-ribbed belts 1-12 was 2.0 mm, and the number of ribs was six (with a belt width of 21.36 mm).

<Flat Belts 1-12>

Flat belts 1-12 of which the inner rubber layer had been made of the above rubber compositions 1-12 were made.

The adhesive rubber layer was made of another EPDM rubber composition. The outer rubber layer was made of the same EPDM rubber composition as that of the inner rubber layer. The cord was made of twisted yarn of polyester (PET) fibers, which was subjected, prior to the molding process, to an adhesion treatment of soaking the twisted yarn in an RFL aqueous solution and thereafter heating the twisted yarn.

its storage elastic modulus E' and loss elastic modulus E" and calculate a loss tangent tan δ as the ratio between these moduli. The measurement was conducted under two conditions, that is, with the static and dynamic strains set to be 3.6% and 3.0%, respectively, and with the static and dynamic strains set to be 1.2% and 1.0%, respectively.

<Stickiness Test>

Figure 5:
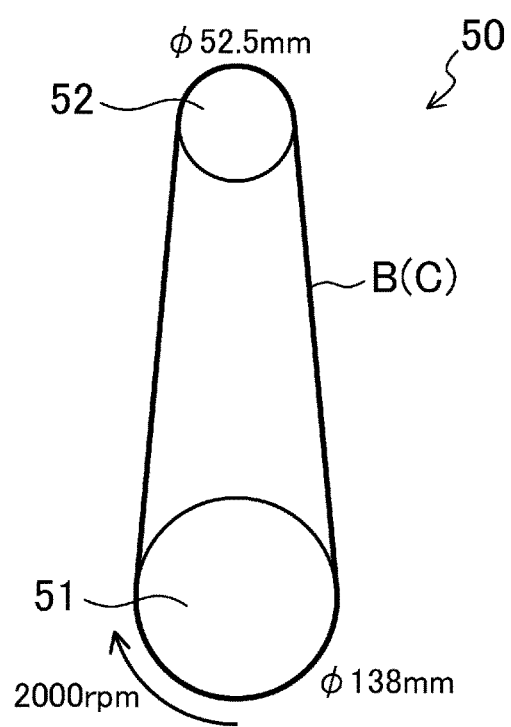
FIG. 5 illustrates a layout of pulleys of a belt running test machine for use to make a stickiness test.

FIG. 5 illustrates a belt running test machine 50 for use to make a stickiness test.

The belt running test machine 50 for stickiness test includes a drive pulley 51 which is a flat pulley having a diameter of 138 mm, and a driven pulley 52 which is a flat pulley having a diameter of 52.5 mm and disposed above the drive pulley 51. The drive source to which the drive pulley 51 is attached is configured to be able to cause rotational fluctuations. The driven pulley 52 is provided with an electric generator with a rated current of 120 A. The driven pulley 52 is capable of moving up and down so that predetermined tension is applicable constantly to a V-ribbed belt or a flat belt.

Each of the V-ribbed belts 1-12 was turned inside out so that the backside rubber layer would face inward, that is, the V-shaped ribs would face outward. Then, the V-ribbed belt B was wound around the drive pulley 51 and the driven pulley 52 so that its backside rubber layer would contact with the drive pulley 51 and the driven pulley 52, to apply a tension of 800 N to the V-ribbed belt, and then the drive pulley 51 was rotated at 2000 rpm at room temperature.

Further, rotational fluctuations of 160 rpm were caused at a frequency of 25 Hz. Moreover, the driven pulley 52 was given such rotation load by which the electric generator would have a power output of 55 A. The drive pulley 51 and the driven pulley 52 were visually checked out every fifteen minutes to see whether there was any sticking of the rubber to the pulleys or not. The belt running time was set to be 90 minutes at the longest, and on sensing the rubber stick to the pulleys by that time limit, the running of the belt was stopped immediately at that point.

As for each of the flat belts 1-12, the flat belt C was wound around the drive pulley 51 and the driven pulley 52 so that its inner rubber layer would contact with the drive pulley 51 and the driven pulley 52, and similar running tests were done.

(Test Results)
<Dynamic Viscoelasticity Properties>

Figure 6:
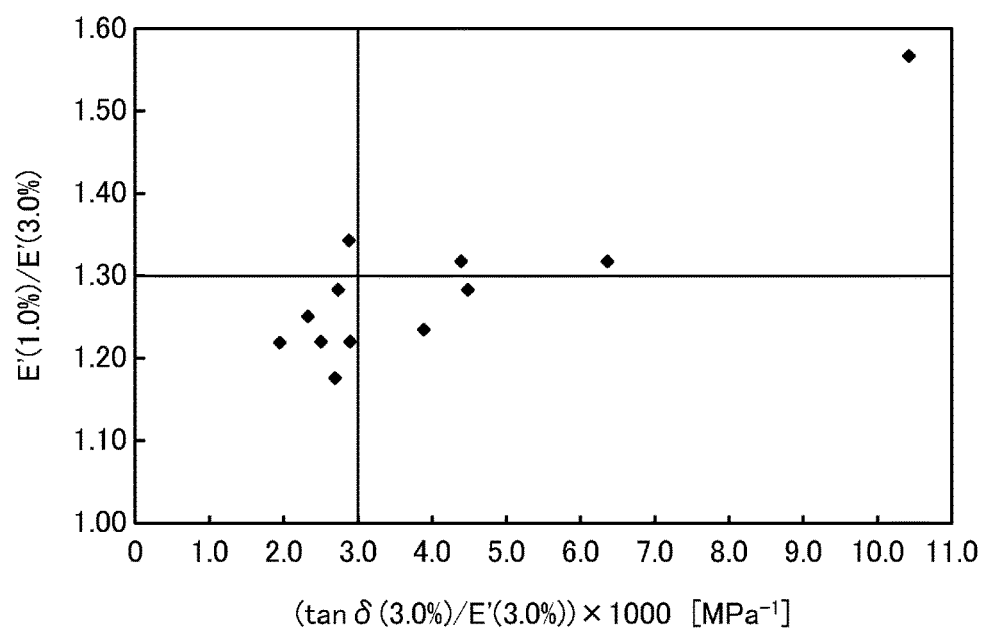
FIG. 6 is a graph showing a relation between (tan δ(3.0%)/E' (3.0%))×1000 and E' (1.0%)/E' (3.0%).

The following Table 2 summarizes the results of tests on the dynamic viscoelasticity properties. FIG. 6 shows a relation between (tan δ (3.0%)/E' (3.0%))×1000 and E' (1.0%)/E' (3.0%).

In the rubber composition 1, E' (1.0%) was 34.41 MPa; tan δ (1.0%) was 0.064; E' (3.0%) was 28.22 MPa; and tan δ (3.0%) was 0.070, which therefore allowed the composition 1 to satisfy (tan δ (3.0%)/E' (3.0%))×1000=2.48 MPa$^{-1}$ and E' (1.0%)/E' (3.0%)=1.22.

In the rubber composition 2, E' (1.0%) was 46.04 MPa; tan δ (1.0%) was 0.078; E' (3.0%) was 36.83 MPa; and tan δ (3.0%) was 0.086, which therefore allowed the composition 2 to satisfy (tan δ (3.0%)/E' (3.0%))×1000=2.34 MPa$^{-1}$ and E' (1.0%)/E' (3.0%)=1.25.

In the rubber composition 3, E' (1.0%) was 22.32 MPa; tan δ (1.0%) was 0.048; E' (3.0%) was 18.30 MPa; and tan δ (3.0%) was 0.053, which therefore allowed the composition 3 to satisfy (tan δ (3.0%)/E' (3.0%))×1000=2.90 MPa$^{-1}$ and E' (1.0%)/E' (3.0%)=1.22.

In the rubber composition 4, E' (1.0%) was 21.01 MPa; tan δ (1.0%) was 0.044; E' (3.0%) was 17.86 MPa; and tan δ (3.0%) was 0.048, which therefore allowed the composition 4 to satisfy (tan δ (3.0%)/E' (3.0%))×1000=2.69 MPa$^{-1}$ and E' (1.0%)/E' (3.0%)=1.18.

In the rubber composition 5, E' (1.0%) was 42.52 MPa; tan δ (1.0%) was 0.062; E' (3.0%) was 34.87 MPa; and tan δ (3.0%) was 0.068, which therefore allowed the composition 5 to satisfy (tan δ (3.0%)/E' (3.0%))×1000=1.95 MPa$^{-1}$ and E' (1.0%)/E' (3.0%)=1.22.

In the rubber composition 6, E' (1.0%) was 47.10 MPa; tan δ (1.0%) was 0.091; E' (3.0%) was 36.74 MPa; and tan δ (3.0%) was 0.100, which therefore allowed the composition 6 to satisfy (tan δ (3.0%)/E' (3.0%))×1000=2.72 MPa$^{-1}$ and E' (1.0%)/E' (3.0%)=1.28.

In the rubber composition 7, E' (1.0%) was 27.45 MPa; tan δ (1.0%) was 0.087; E' (3.0%) was 21.41 MPa; and tan δ (3.0%) was 0.096, which therefore allowed the composition 7 to satisfy (tan δ (3.0%)/E' (3.0%))×1000=4.48 MPa$^{-1}$ and E' (1.0%)/E' (3.0%)=1.28.

In the rubber composition 8, E' (1.0%) was 51.70 MPa; tan δ (1.0%) was 0.100; E' (3.0%) was 38.52 MPa; and tan δ (3.0%) was 0.111, which therefore allowed the composition 8 to satisfy (tan δ (3.0%)/E' (3.0%))×1000=2.88 MPa$^{-1}$ and E' (1.0%)/E' (3.0%)=1.34.

TABLE 2

| | RUBBER COMPOSITION | | | | | |
|---|---|---|---|---|---|---|
| | 1 | 2 | 3 | 4 | 5 | 6 |
| E'(1.0%) | 34.41 | 46.04 | 22.32 | 21.01 | 42.52 | 47.10 |
| tanδ(1.0%) | 0.064 | 0.078 | 0.048 | 0.044 | 0.062 | 0.091 |
| E'(3.0%) | 28.22 | 36.83 | 18.30 | 17.86 | 34.87 | 36.74 |
| tanδ(3.0%) | 0.070 | 0.086 | 0.053 | 0.048 | 0.068 | 0.100 |
| (E'(1.0%)/E'(3.0%)) × 1000 (MPa$^{-1}$) | 2.48 | 2.34 | 2.90 | 2.69 | 1.95 | 2.72 |
| tanδ(3.0%)/E'(3.0%) | 1.22 | 1.25 | 1.22 | 1.18 | 1.22 | 1.28 |

| | RUBBER COMPOSITION | | | | | |
|---|---|---|---|---|---|---|
| | 7 | 8 | 9 | 10 | 11 | 12 |
| E'(1.0%) | 27.45 | 51.70 | 48.90 | 28.12 | 30.11 | 30.46 |
| tanδ(1.0%) | 0.087 | 0.100 | 0.148 | 0.124 | 0.079 | 0.204 |
| E'(3.0%) | 21.41 | 38.52 | 37.16 | 21.37 | 24.39 | 19.47 |
| tanδ(3.0%) | 0.096 | 0.111 | 0.163 | 0.136 | 0.095 | 0.203 |
| (E'(1.0%)/E'(3.0%)) × 1000 (MPa$^{-1}$) | 4.48 | 2.88 | 4.39 | 6.36 | 3.90 | 10.43 |
| tanδ(3.0%)/E'(3.0%) | 1.28 | 1.34 | 1.32 | 1.32 | 1.23 | 1.56 |

In the rubber composition 9, E' (1.0%) was 48.90 MPa; tan δ (1.0%) was 0.148; E' (3.0%) was 37.16 MPa; and tan δ (3.0%) was 0.163, which therefore allowed the composition 9 to satisfy (tan δ (3.0%)/E' (3.0%))×1000=4.39 MPa$^{-1}$ and E' (1.0%)/E' (3.0%)=1.32.

In the rubber composition 10, E' (1.0%) was 28.12 MPa; tan δ (1.0%) was 0.124; E' (3.0%) was 21.37 MPa; and tan δ (3.0%) was 0.136, which therefore allowed the composition 10 to satisfy (tan δ (3.0%)/E' (3.0%))×1000=6.36 MPa$^{-1}$ and E' (1.0%)/E' (3.0%)=1.32.

In the rubber composition 11, E' (1.0%) was 30.11 MPa; tan δ (1.0%) was 0.079; E' (3.0%) was 24.39 MPa; and tan δ (3.0%) was 0.095, which therefore allowed the composition 11 to satisfy (tan δ (3.0%)/E' (3.0%))×1000=3.90 MPa$^{-1}$ and E' (1.0%)/E' (3.0%)=1.23.

In the rubber composition 12, E' (1.0%) was 30.46 MPa; tan δ (1.0%) was 0.204; E' (3.0%) was 19.47 MPa; and tan δ (3.0%) was 0.203, which therefore allowed the composition 12 to satisfy (tan δ (3.0%)/E' (3.0%))×1000=10.43 MPa$^{-1}$ and E' (1.0%)/E' (3.0%)=1.56.

<Stickiness Test>

The following Table 3 summarizes the results of the stickiness tests.

TABLE 3

| | \multicolumn{6}{c}{V-RIBBED BELT} | | | | | |
|---|---|---|---|---|---|---|
| | 1 | 2 | 3 | 4 | 5 | 6 |
| 15 min | NO | NO | NO | NO | NO | NO |
| 30 min | NO | NO | NO | NO | NO | NO |
| 45 min | NO | NO | NO | NO | NO | NO |
| 60 min | NO | NO | NO | NO | NO | NO |
| 75 min | NO | NO | NO | NO | NO | NO |
| 90 min | NO | NO | NO | NO | NO | NO |

| | \multicolumn{6}{c}{V-RIBBED BELT} | | | | | |
|---|---|---|---|---|---|---|
| | 7 | 8 | 9 | 10 | 11 | 12 |
| 15 min | NO | NO | NO | NO | NO | YES |
| 30 min | NO | NO | NO | YES | NO | |
| 45 min | YES | NO | NO | | NO | |
| 60 min | | NO | YES | | NO | |
| 75 min | | YES | | | YES | |
| 90 min | | | | | | |

| | \multicolumn{6}{c}{FLAT BELT} | | | | | |
|---|---|---|---|---|---|---|
| | 1 | 2 | 3 | 4 | 5 | 6 |
| 15 min | NO | NO | NO | NO | NO | NO |
| 30 min | NO | NO | NO | NO | NO | NO |
| 45 min | NO | NO | NO | NO | NO | NO |
| 60 min | NO | NO | NO | NO | NO | NO |
| 75 min | NO | NO | NO | NO | NO | NO |
| 90 min | NO | NO | NO | NO | NO | NO |

| | \multicolumn{6}{c}{FLAT BELT} | | | | | |
|---|---|---|---|---|---|---|
| | 7 | 8 | 9 | 10 | 11 | 12 |
| 15 min | NO | NO | NO | NO | NO | YES |
| 30 min | NO | NO | NO | YES | NO | |
| 45 min | NO | NO | NO | | NO | |
| 60 min | YES | NO | YES | | YES | |
| 75 min | | YES | | | | |
| 90 min | | | | | | |

No sticking of the rubber from any of the V-ribbed belts 1-6 and the flat belts 1-6 was observed even after the belt had run for 90 minutes.

Sticking of the rubber from the V-ribbed belt 7 was observed after the belt had run for 45 minutes. Sticking of the rubber from the flat belt 7 was observed after the belt had run for 60 minutes. Sticking of the rubber from each of the V-ribbed belt 8 and the flat belt 8 was observed after the belt had run for 75 minutes. Sticking of the rubber from each of the V-ribbed belt 9 and the flat belt 9 was observed after the belt had run for 60 minutes. Sticking of the rubber from each of the V-ribbed belt 10 and the flat belt 10 was observed after the belt had run for 30 minutes. Sticking of the rubber from the V-ribbed belt 11 was observed after the belt had run for 75 minutes. Sticking of the rubber from the flat belt 7 was observed after the belt had run for 60 minutes. Sticking of the rubber from each of the V-ribbed belt 12 and the flat belt 12 was observed after the belt had run for 15 minutes.

The present invention can be used effectively as a power transmission belt.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The invention claimed is:

1. A power transmission belt used by being wound around a flat pulley so that an outer peripheral surface of the belt contacts with the flat pulley, comprising:
    (a) a portion forming the outer peripheral surface made of a rubber composition;
    (b) an adhesive rubber layer;
    (c) a cord embedded in the adhesive rubber layer; and
    (d) an inner peripheral rubber layer attached to the portion (a) through the adhesive layer;
    wherein the rubber composition comprises:
    100 parts by mass of ethylene-propylene-diene terpolymer as a rubber component,
    30 to 70 parts by mass of an unsaturated metal carboxylate salt,
    5 to 25 parts by mass of carbon black, and
    an organic peroxide as a crosslinker;
    wherein the ethylene-propylene-diene terpolymers has a Mooney viscosity $ML_{1+4}$ (100° C.) of 30 or more, and an ethylene content of 55 mass % or more;
    wherein a total of 35 to 95 parts by mass of the unsaturated metal carboxylate salt and the carbon black are added relative to 100 parts by mass of the rubber component, and an mass ratio of the unsaturated metal carboxylate salt to the carbon black (unsaturated metal carboxylate salt/carbon black) is 1.2/1 to 14/1;
    wherein dynamic viscoelasticity properties of the crosslinked rubber composition in a belt length direction satisfy:
    ((a loss tangent tan δ at a temperature of 25° C. and a dynamic strain of 3.0%)/(a storage elastic modulus E' at a temperature of 25° C. and a dynamic strain 3.0%))× 1000<3.0 MPa$^{-1}$, and (a storage elastic modulus E' at a temperature of 25° C. and a dynamic strain of 1.0%)/(a storage elastic modulus E' at a temperature of 25° C. and a dynamic strain of 3.0%)<1.30.

2. The power transmission belt of claim 1, wherein the unsaturated metal carboxylate salt includes zinc dimethacrylate.

3. The power transmission belt of claim 1, wherein the carbon black includes FEF carbon black.

4. The power transmission belt of claim 1, wherein the amount of the organic peroxide is 8 to 12 parts by mass relative to 100 parts by mass of the rubber component.

5. The power transmission belt of claim 1, wherein the power transmission belt is a V-ribbed belt.

6. The power transmission belt of claim 1, wherein the power transmission belt is a flat belt.

7. The power transmission belt according to claim 1, wherein the inner peripheral layer is made of the rubber composition.

8. A power transmission belt used by being wound around a flat pulley so that an inner peripheral surface of the belt contacts with the flat pulley, comprising:
 (a) a portion forming the inner peripheral surface made of a rubber composition;
 (b) an adhesive rubber layer;
 (c) a cord embedded in the adhesive rubber layer; and
 (d) an outer peripheral rubber layer attached to the portion (a) through the adhesive layer;
 wherein the rubber composition comprises:
 100 parts by mass of ethylene-propylene-diene terpolymer as a rubber component,
 30 to 70 parts by mass of an unsaturated metal carboxylate salt,
 5 to 25 parts by mass of carbon black, and
 an organic peroxide as a crosslinker;
 wherein the ethylene-propylene-diene terpolymers has a Mooney viscosity $ML_{1+4}$ (100° C.) of 30 or more, and an ethylene content of 55 mass % or more;
 wherein a total of 35 to 95 parts by mass of the unsaturated metal carboxylate salt and the carbon black are added relative to 100 parts by mass of the rubber component, and an mass ratio of the unsaturated metal carboxylate salt to the carbon black (unsaturated metal carboxylate salt/carbon black) is 1.2/1 to 14/1;
 wherein dynamic viscoelasticity properties of the cross-linked rubber composition in a belt length direction satisfy:
 ((a loss tangent tan δ at a temperature of 25° C. and a dynamic strain of 3.0%)/(a storage elastic modulus E' at a temperature of 25° C. and a dynamic strain 3.0%))× 1000<3.0 $MPa^{-1}$, and (a storage elastic modulus E' at a temperature of 25° C. and a dynamic strain of 1.0%)/(a storage elastic modulus E' at a temperature of 25° C. and a dynamic strain of 3.0%)<1.30.

* * * * *